US010747682B2

(12) United States Patent
Bennett et al.

(10) Patent No.: US 10,747,682 B2
(45) Date of Patent: *Aug. 18, 2020

(54) SYNCHRONIZING A TRANSLATION LOOKASIDE BUFFER WITH AN EXTENDED PAGING TABLE

(71) Applicant: Intel Corporation, Santa Clara, CA (US)

(72) Inventors: Steven M. Bennett, Hillsboro, OR (US); Andrew V. Anderson, Hillsboro, OR (US); Gilbert Neiger, Portland, OR (US); Richard Uhlig, Hillsboro, OR (US); Scott Dion Rodgers, Hillsboro, OR (US); Rajesh M. Sankaran, Portland, OR (US); Camron Rust, Hillsboro, OR (US); Sebastian Schoenberg, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,363

(22) Filed: Mar. 5, 2018

(65) Prior Publication Data

US 2018/0196758 A1    Jul. 12, 2018

Related U.S. Application Data

(63) Continuation of application No. 15/620,663, filed on Jun. 12, 2017, now Pat. No. 10,180,911, which is a
(Continued)

(51) Int. Cl.
*G06F 12/00* (2006.01)
*G06F 12/1027* (2016.01)
(Continued)

(52) U.S. Cl.
CPC ...... *G06F 12/1027* (2013.01); *G06F 9/30047* (2013.01); *G06F 9/30076* (2013.01);
(Continued)

(58) Field of Classification Search
None
See application file for complete search history.

(56) References Cited

U.S. PATENT DOCUMENTS 4,792,897 A * 12/1988 Gotou ................. G06F 12/1009
711/207
5,109,496 A * 4/1992 Beausoleil ............ G06F 12/123
711/207
(Continued)

FOREIGN PATENT DOCUMENTS

DE    102009024487 A1    12/2010
EP       0425771 A2     5/1991
(Continued)

OTHER PUBLICATIONS

Abandonment from U.S. Appl. No. 14/867,025, dated Apr. 1, 2016, 1 page.
(Continued)

*Primary Examiner* — John A Lane
(74) *Attorney, Agent, or Firm* — Nicholson De Vos Webster & Elliott LLP

(57) ABSTRACT

A processor including logic to execute an instruction to synchronize a mapping from a physical address of a guest of a virtualization based system (guest physical address) to a physical address of the host of the virtualization based system (host physical address), and stored in a translation lookaside buffer (TLB), with a corresponding mapping stored in an extended paging table (EPT) of the virtualization based system.

10 Claims, 6 Drawing Sheets

Related U.S. Application Data continuation of application No. 14/867,025, filed on Sep. 28, 2015, now Pat. No. 9,678,890, which is a continuation of application No. 14/675,325, filed on Mar. 31, 2015, now Pat. No. 9,251,094, which is a continuation of application No. 14/517,849, filed on Oct. 18, 2014, now Pat. No. 9,122,624, which is a continuation of application No. 14/070,561, filed on Nov. 3, 2013, now Pat. No. 8,949,571, which is a continuation of application No. 13/658,752, filed on Oct. 23, 2012, now Pat. No. 8,601,233, which is a continuation of application No. 13/348,608, filed on Jan. 11, 2012, now Pat. No. 8,296,546, which is a continuation of application No. 12/495,555, filed on Jun. 30, 2009, now Pat. No. 8,099,581, which is a continuation of application No. 11/504,964, filed on Aug. 15, 2006, now Pat. No. 7,555,628.

(51) Int. Cl.
| | | |
|---|---|---|
| *G06F 12/1009* | (2016.01) | |
| *G06F 12/1036* | (2016.01) | |
| *G06F 9/30* | (2018.01) | |
| *G06F 12/02* | (2006.01) | |
| *G06F 9/455* | (2018.01) | |
| *G06F 12/0875* | (2016.01) | |
| *G06F 12/1045* | (2016.01) | |

(52) U.S. Cl.
CPC ...... *G06F 9/45558* (2013.01); *G06F 12/0246* (2013.01); *G06F 12/0875* (2013.01); *G06F 12/1009* (2013.01); *G06F 12/1036* (2013.01); *G06F 12/1054* (2013.01); *G06F 2009/45583* (2013.01); *G06F 2212/152* (2013.01); *G06F 2212/2022* (2013.01); *G06F 2212/452* (2013.01); *G06F 2212/50* (2013.01); *G06F 2212/65* (2013.01); *G06F 2212/657* (2013.01); *G06F 2212/68* (2013.01); *G06F 2212/683* (2013.01); *G06F 2212/7201* (2013.01)

(56) References Cited

U.S. PATENT DOCUMENTS

| | | | | |
|---|---|---|---|---|
| 5,675,762 A * | 10/1997 | Bodin | ............... | G06F 12/1081 711/206 |
| 5,711,579 A | 1/1998 | Albrecht | | |
| 6,393,544 B1 * | 5/2002 | Bryg | ............... | G06F 12/1018 711/202 |
| 6,430,670 B1 * | 8/2002 | Bryg | ............... | G06F 12/1036 711/205 |
| 7,370,160 B2 | 5/2008 | Neiger et al. | | |
| 7,409,487 B1 * | 8/2008 | Chen | ............... | G06F 12/1036 711/6 |
| 7,555,628 B2 * | 6/2009 | Bennett | ............... | G06F 12/1009 711/203 |
| 7,802,050 B2 | 9/2010 | Savagaonkar et al. | | |
| 7,882,318 B2 | 2/2011 | Savagaonkar et al. | | |
| 8,099,581 B2 * | 1/2012 | Bennett | ............... | G06F 12/1009 711/203 |
| 2004/0003324 A1 * | 1/2004 | Uhlig | ............... | G06F 11/0712 714/38.13 |
| 2004/0054518 A1 * | 3/2004 | Altman | ............... | G06F 9/45537 703/27 |
| 2004/0064668 A1 * | 4/2004 | Kjos | ............... | G06F 12/1027 711/202 |
| 2004/0078631 A1 * | 4/2004 | Rogers | ............... | G06F 12/08 714/5.11 |
| 2004/0117593 A1 * | 6/2004 | Uhlig | ............... | G06F 12/1036 711/207 |
| 2005/0015378 A1 * | 1/2005 | Gammel | ............... | G06F 12/1009 |
| 2005/0076324 A1 * | 4/2005 | Lowell | ............... | G06F 9/45558 717/100 |
| 2005/0081199 A1 * | 4/2005 | Traut | ............... | G06F 9/45554 718/1 |
| 2005/0091354 A1 * | 4/2005 | Lowell | ............... | G06F 9/4856 709/223 |
| 2005/0240751 A1 * | 10/2005 | Neiger | ............... | G06F 9/45537 711/207 |
| 2005/0273570 A1 * | 12/2005 | DeSouter | ............... | G06F 12/0292 711/203 |
| 2006/0005200 A1 * | 1/2006 | Vega | ............... | G06F 12/10 718/108 |
| 2006/0026383 A1 * | 2/2006 | Dinechin | ............... | G06F 12/109 711/207 |
| 2006/0139360 A1 * | 6/2006 | Panesar | ............... | G06F 12/1081 345/568 |
| 2007/0005810 A1 | 1/2007 | Halleck et al. | | |
| 2007/0005870 A1 | 1/2007 | Neiger et al. | | |
| 2008/0082772 A1 * | 4/2008 | Savagaonkar | ........ | G06F 12/145 711/163 |

FOREIGN PATENT DOCUMENTS

| | | |
|---|---|---|
| EP | 1426868 A2 | 6/2004 |
| EP | 1681630 A1 | 7/2006 |
| JP | H03154949 A | 7/1991 |
| JP | H04357540 A | 12/1992 |
| JP | 2001056783 A | 2/2001 |
| JP | 2006196005 A | 7/2006 |
| TW | 200307866 A | 12/2003 |
| TW | 200408935 A | 6/2004 |
| WO | 9211597 A1 | 7/1992 |
| WO | 02079998 A1 | 10/2002 |
| WO | 2006081582 A2 | 8/2006 |

OTHER PUBLICATIONS

Advanced Micro Devices, "AMD64 Virtualization Codenamed "Pacifica" Technology", Secure Virtual Machine Architecture Reference Manual, Publication No. 33047-Rev.3.01, May 2005, pp. 49-51; http://enterprise.amd.com/downloadables/Pacifica.sub--spec.pdf, May 2005.
AMD64 Technology, "AMD 64 Architecture Programmer's Manual", vol. 2 : System Programming, Publication No. 24593, Rev. 3.11, Dec. 2005, pp. 464-465.
Combined Search and Examination Report for UK Application No. GB0715604.5, dated Dec. 10, 2007, 8 pages.
IBM System/370 Extended Architecture, Interpretive Execution, Publication No. SA22-7095-0: File No. S370-01, Jan. 1984, 32 pages.
Non-Final Office Action from U.S. Appl. No. 11/504,964, dated Sep. 5, 2008, 8 pages.
Non-Final Office Action from U.S. Appl. No. 12/495,555, dated Apr. 11, 2011, 7 pages.
Non-Final Office Action from U.S. Appl. No. 13/348,608, dated Mar. 12, 2012, 6 pages.
Non-Final Office Action from U.S. Appl. No. 13/658,752, dated Apr. 25, 2013, 10 pages.
Non-Final Office Action from U.S. Appl. No. 14/867,020, dated Nov. 20, 2015, 11 pages.
Non-Final Office Action from U.S. Appl. No. 15/620,663, dated Jan. 12, 2018, 14 pages.
Non-Final Office Action from U.S. Appl. No. 14/517,849, dated Jan. 16, 2015, 10 pages.
Non-Final Office Action from U.S. Appl. No. 14/867,024, dated Dec. 10, 2015, 22 pages.
Non-Final Office Action from U.S. Appl. No. 14/867,025, dated Dec. 3, 2015, 19 pages.
Non-Final Office Action from U.S. Appl. No. 14/867,027, dated Dec. 4, 2015, 21 pages.
Non-Final Office Action from U.S. Appl. No. 14/675,292, dated May 21, 2015, 6 pages.

(56) References Cited

OTHER PUBLICATIONS

Non-Final Office Action from U.S. Appl. No. 14/675,325, dated May 29, 2015, 6 pages.
Non-Final Office Action from U.S. Appl. No. 14/867,018, dated Oct. 23, 2015, 13 pages.
Non-Final Office Action from U.S. Appl. No. 14/867,023, dated Dec. 3, 2015, 22 pages.
Non-Final Office Action from U.S. Appl. No. 15/912,405, dated Apr. 13, 2018, 30 pages.
Notice of Allowance from U.S. Appl. No. 11/504,964, dated Feb. 27, 2009, 5 pages.
Notice of Allowance from U.S. Appl. No. 12/495,555, dated Aug. 5, 2011, 11 pages.
Notice of Allowance from U.S. Appl. No. 12/495,555, dated Sep. 8, 2011, 11 pages.
Notice of Allowance from U.S. Appl. No. 13/348,608, dated Jul. 2, 2012, 10 pages.
Notice of Allowance from U.S. Appl. No. 13/658,752, dated Aug. 7, 2013, 6 pages.
Notice of Allowance from U.S. Appl. No. 14/867,020, dated Feb. 17, 2016, 5 pages.
Notice of Allowance from U.S. Appl. No. 14/517,849, dated May 4, 2015, 5 pages.
Notice of Allowance from U.S. Appl. No. 14/675,297, dated Apr. 23, 2015, 11 pages.
Notice of Allowance from U.S. Appl. No. 14/867,024, dated Mar. 4, 2016, 5 pages.
Notice of Allowance from U.S. Appl. No. 14/867,025, dated Feb. 18, 2016, 6 pages.
Notice of Allowance from U.S. Appl. No. 14/867,027, dated Feb. 23, 2016, 5 pages.
Notice of Allowance from U.S. Appl. No. 14/675,292, dated Nov. 20, 2015, 12 pages.
Notice of Allowance from U.S. Appl. No. 14/675,325, dated Oct. 29, 2015, 10 pages.
Notice of Allowance from U.S. Appl. No. 14/867,018, dated Feb. 12, 2016, 5 pages.
Notice of Allowance from U.S. Appl. No. 14/867,023, dated Feb. 12, 2016, 5 pages.
Notice of Allowance from U.S. Appl. No. 15/620,663, dated May 15, 2018, 6 pages.
Office Action from foreign counterpart German Patent Application No. 102007037814.0, dated Jan. 21, 2010, 6 pages.
Office Action from foreign counterpart Japanese Patent Application No. 2007-211396, dated Sep. 21, 2010, 6 pages.

\* cited by examiner

SYNCHRONIZING A TRANSLATION LOOKASIDE BUFFER WITH AN EXTENDED PAGING TABLE

RELATED APPLICATIONS

This is a Continuation of U.S. patent application Ser. No. 15/620,663, filed Jun. 12, 2017, which is a Continuation of U.S. patent application Ser. No. 14/867,025, filed Sep. 28, 2015, now U.S. Issued U.S. Pat. No. 9,678,890, Issued on Jun. 13, 2017; which is a Continuation of U.S. patent application Ser. No. 14/675,325, filed Mar. 31, 2015, now U.S. Pat. No. 9,251,094; which is a Continuation of U.S. patent application Ser. No. 14/517,849, filed Oct. 18, 2014, now U.S. Pat. No. 9,122,624; which is a Continuation of U.S. patent application Ser. No. 14/070,561, filed Nov. 3, 2013, now U.S. Pat. No. 8,949,571; which is a Continuation of U.S. patent application Ser. No. 13/658,752, filed Oct. 23, 2012, now U.S. Pat. No. 8,601,233; which is a Continuation of U.S. patent application Ser. No. 13/348,608, filed Jan. 11, 2012, now U.S. Pat. No. 8,296,546; which is a Continuation of U.S. patent application Ser. No. 12/495,555, filed Jun. 30, 2009, now U.S. Pat. No. 8,099,581; which is a Continuation of U.S. patent application Ser. No. 11/504,964, filed Aug. 15, 2006, now U.S. Pat. No. 7,555,628; which is related to U.S. patent application Ser. No. 11/036,736, filed Jan. 14, 2005, now U.S. Pat. No. 7,886,126.

BACKGROUND OF THE INVENTION

Virtualization enables a single host machine with hardware and software support for virtualization to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which controls the host machine. The VMM provides guest software operating in a virtual machine with a set of resources (e.g., processors, memory, IO devices). The VMM may map some or all of the components of a physical host machine into the virtual machine, and may create fully virtual components, emulated in software in the VMM, which are included in the virtual machine (e.g., virtual IO devices). The VMM may thus be said to provide a "virtual bare machine" interface to guest software. The VMM uses facilities in a hardware virtualization architecture to provide services to a virtual machine and to provide protection from and between multiple virtual machines executing on the host machine. As guest software executes in a virtual machine, certain instructions executed by the guest software (e.g., instructions accessing peripheral devices) would normally directly access hardware, were the guest software executing directly on a hardware platform. In a virtualization system supported by a VMM, these instructions may cause a transition to the VMM, referred to herein as a virtual machine exit. The VMM handles these instructions in software in a manner suitable for the host machine hardware and host machine peripheral devices consistent with the virtual machines on which the guest software is executing. Similarly, certain interrupts and exceptions generated in the host machine may need to be intercepted and managed by the VMM or adapted for the guest software by the VMM before being passed on to the guest software for servicing. The VMM then transitions control to the guest software and the virtual machine resumes operation. The transition from the VMM to the guest software is referred to herein as a virtual machine entry.

As is known in the art, a page table is often used to provide a mapping from linear memory to physical memory in a typical processor based system. Page tables are generally memory-resident structures and therefore accessing a page table to determine a physical address corresponding to a linear address causes a memory access, which may delay processing time. In order to alleviate this concern, many processor implementations include a high speed memory or bank of registers within the processor termed a translation lookaside buffer (TLB) in which some subset of the current linear to physical memory mappings that are in use is cached, based on the values in the page table. This allows a processor to more rapidly access a translation of a linear address to the corresponding physical address than would be possible in general if the processor had to access the page table. Processor implementations generally provide instructions to manage the TLB, including an instruction to invalidate or update all the entries in the TLB based on current translations as stored in the page tab.

BRIEF DESCRIPTION OF THE DRAWINGS

The present invention is illustrated by way of example and not limitation in the figures of the accompanying drawings.

DETAILED DESCRIPTION

Figure 1:
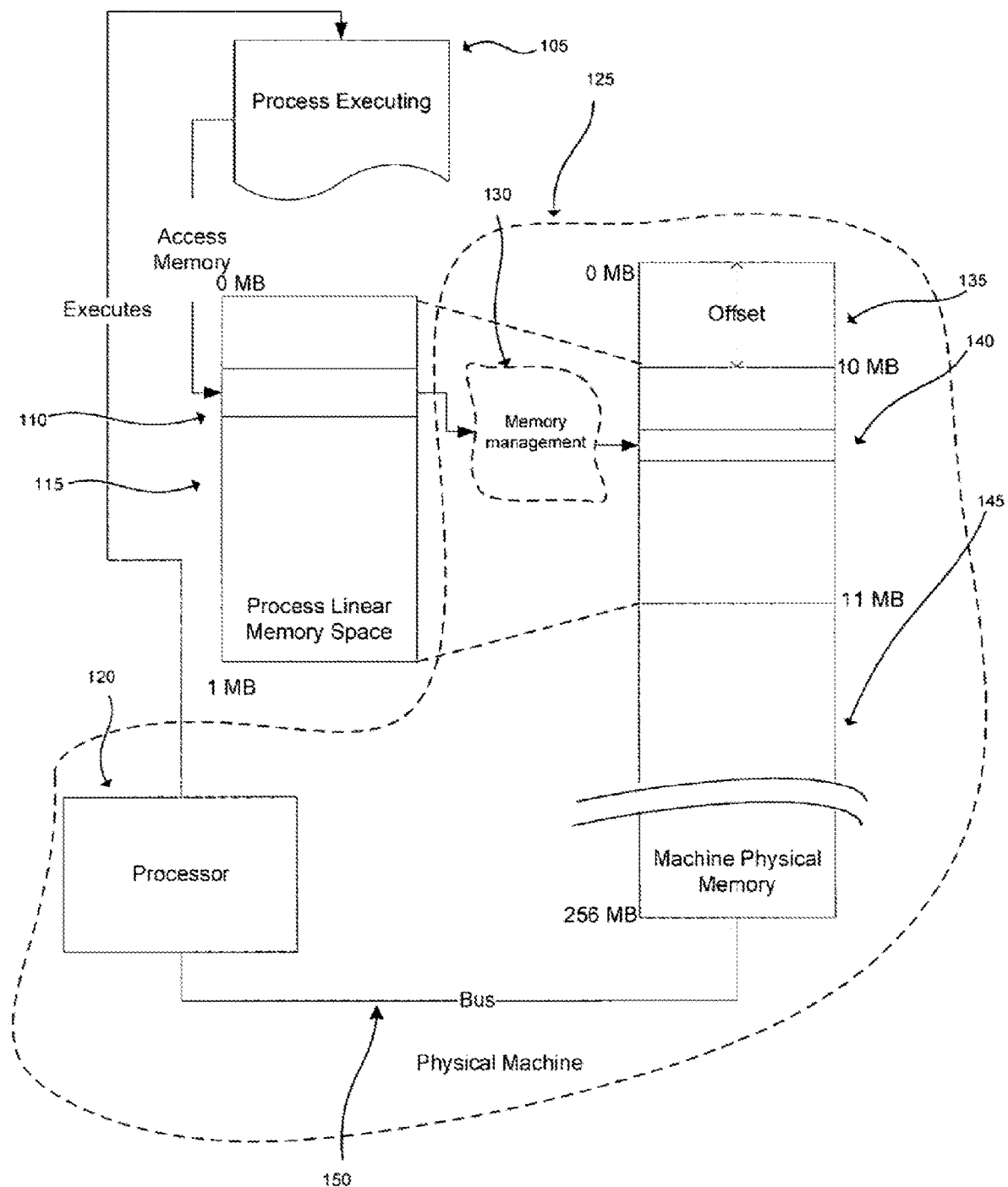
FIG. 1 depicts the relationship between process and physical memory.

FIG. 1 shows a process executing on a processor-based system which incorporates a processor and a memory communicatively coupled to the processor by a bus. With reference to FIG. 1, when a process 105 references a memory location 110 in its linear address space 115 (linear memory space), a reference to an actual address 140 in the physical memory 145 of the machine 125 (machine physical memory) is generated by memory management 130, which may be implemented in hardware (sometimes incorporated into the processor 120) and software (generally in the operating system of the machine). Memory management 130, among other functions maps a location in the linear address space to a location in physical memory of the machine. As shown in FIG. 1, a process may have a different view of memory from the actual memory available in the physical machine. In the example depicted in FIG. 1, the process operates in a linear address space from 0 to 1 MB which is actually mapped by the memory management hardware and software into a portion of the physical memory which itself has an address space from 10 to 11 MB; to compute a physical address from a process space address, an offset 135 may be added to the linear address. More complex mappings from linear address space to physical memory are possible, for example, the physical memory corresponding to linear memory may be divided into parts such as pages and be interleaved with pages from other processes in physical memory.

Memory is customarily divided into pages, each page containing a known amount of data, varying across implementations, e.g. a page may contain 4096 bytes of memory, 1 MB of memory, or any other amount of memory as may be desired for a particular application. As memory locations are referenced by the executing process, they are translated into page references. In a typical machine, memory management maps a reference to a page in linear memory to a page in machine physical memory. In general, memory management may use a page table to specify the physical page location corresponding to a process space page location.

One aspect of managing guest software in a virtual machine environment is the management of memory. Handling memory management actions taken by the guest software executing in a virtual machine creates complexity for a controlling system such as a virtual machine monitor. Consider for example a system in which two virtual machines execute via virtualization on a host machine implemented on an x86 platform which may include page tables implemented as part of the x86 processor. Further, assume that each virtual machine itself presents an abstraction of an x86 machine to the guest software executing thereon. Guest software executing on each virtual machine may make references to a guest linear memory address, which in turn is translated by the guest machine's memory management system to a guest-physical memory address. However, guest-physical memory itself may be implemented by a further mapping in host-physical memory through a VMM and the virtualization subsystem in hardware on the host processor. Thus, references to guest memory by guest processes or the guest operating system, including for example references to guest x86 page table control registers, must then be intercepted by the VMM because they cannot be directly passed on to the host machine's page table without further reprocessing, as the guest-physical memory does not, in fact, correspond directly to host-physical memory but is rather further remapped through the virtualization system of the host machine.

Figure 2:
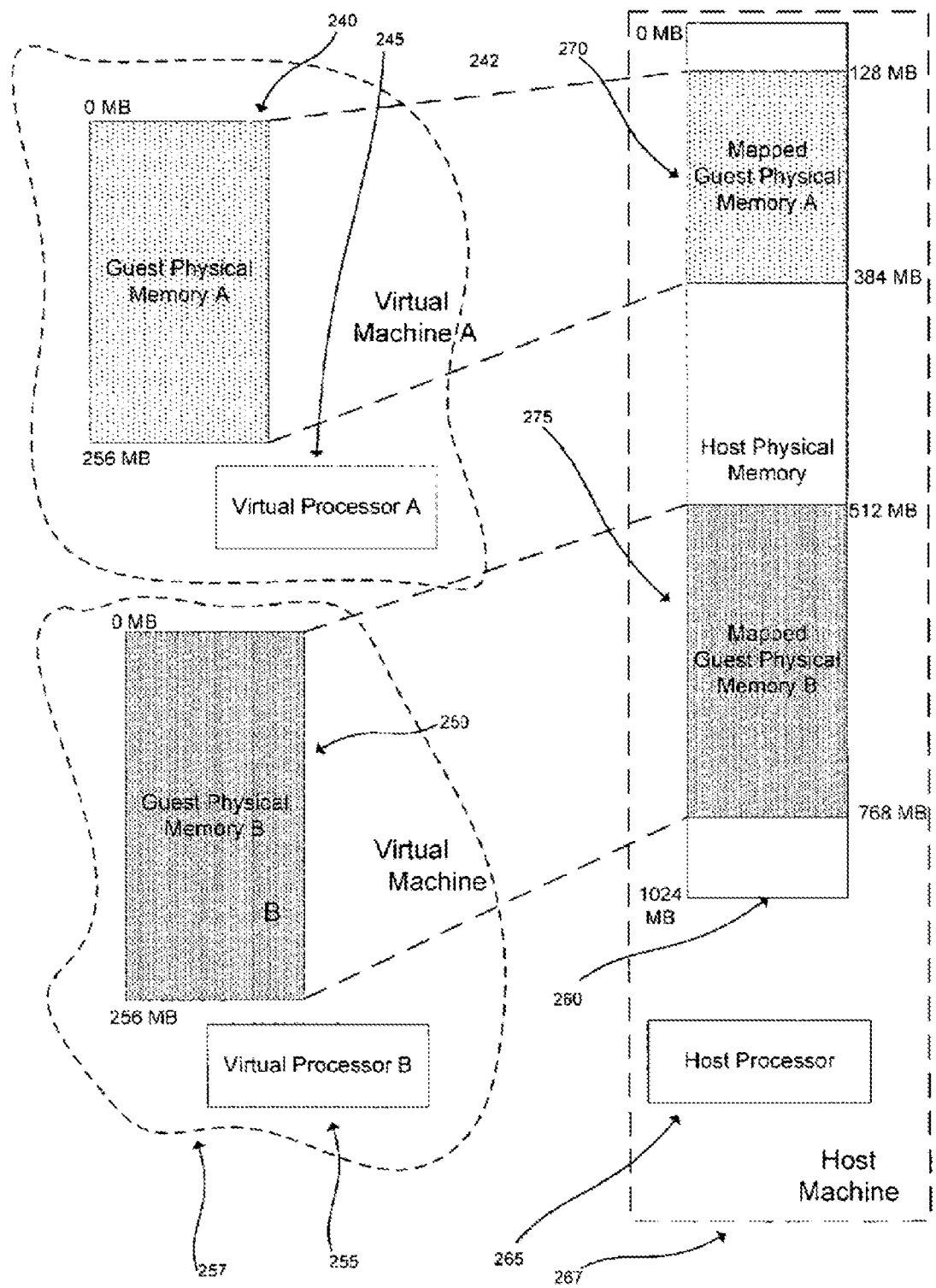
FIG. 2 depicts abstractly the relationship between virtual machines and a host machine in one embodiment.

FIG. 2: FIG. 2 depicts the relationship between one or more virtual machines executing on a host machine with specific regard to the mapping of guest memory in one embodiment. FIG. 2 illustrates how guest-physical memory is remapped through the virtualization system of the host machine. Each virtual machine such as virtual machine A, 242, and virtual machine B, 257, presents a virtual processor 245 and 255 respectively to guest software running on the virtual machines. Each machine provides an abstraction of physical memory to the guest operating system or other guest software, guest-physical memories 240 and 250, respectively. As guest software executes on the virtual machines 242 and 257, it is actually executed by the host machine 267 on host processor 265 utilizing host-physical memory 260.

As shown in FIG. 2, in this embodiment, guest-physical memory 240 which is presented as a physical memory space starting at address 0 in virtual machine A, 242, is mapped to some contiguous region 270 in host-physical memory 260. Similarly, guest-physical memory 250 in virtual machine B, 257, is mapped to a different portion 275 of host-physical memory 260. As shown in FIG. 2, the host machine might have 1024 MB of host-physical memory. If each virtual machine 242 and 257 is assigned 256 MB of memory, one possible mapping might be that virtual machine A, 242, is assigned the range 128-384 MB and virtual machine B, 257, is assigned the range 512-768 MB. Both virtual machines 242 and 257 reference a guest-physical address space of 0-256 MB. Only the VMM is aware that each virtual machine's address space maps to different portions of the host-physical address space.

The virtual machines and memory mapping shown in FIG. 2 are only one representation of one embodiment, in other embodiments, the actual number of virtual machines executing on a host machine may vary from one to many; the actual memory sizes of the host machine and the virtual machines may vary and be variable from virtual machine to virtual machine. The example depicts a simple, contiguous allocation of memory to virtual machines. In a more general case, the physical-memory pages allocated to a virtual machine may not be contiguous and might be distributed in the host-physical memory interleaved with each other and with pages belonging to the VMM and to other host processes.

A processor-based system that is presented as a virtual machine in a system such as that depicted in FIG. 2 may implement a virtual machine in all its complexity. Thus for example, a virtual machine may present a full view of guest-physical memory to the guest OS, and perform memory management for guest software executing on the virtual machine, using memory management provided by the guest OS and the virtual processor or other virtual hardware of the virtual machine. In one exemplary embodiment, the virtual machine may present an x86 platform including x86 hardware support such as page tables for memory management to the guest OS, and in turn be actually executing on a host platform which is also an x86 platform including x86 hardware for memory management. Without additional mechanisms, a virtualization system in this embodiment must implement a physical-memory virtualization algorithm in the VMM using, as one possible solution, x86 page table shadowing to remap, partition and protect physical memory. Thus, for example, when guest software attempts to access the x86 page tables of the virtual machine, the VMM must overlay functionality required for virtualization (e.g., remapping physical addresses) onto the functionality required by the guest OS.

To this end, the VMM must trap a variety of events surrounding the use of the paging mechanism by the guest software. This includes writes to control registers such as control registers of the x86 memory management system (e.g., CR0, CR3 and C4), accesses to model-specific registers (MSRs) associated with paging and memory access (e.g., memory-type range registers (MTRRs)), handling certain exceptions (e.g., page faults), as described in the x86 documentation. This use of the x86 page tables to virtualize physical memory is complex and exacts a significant performance overhead.

Figure 3:
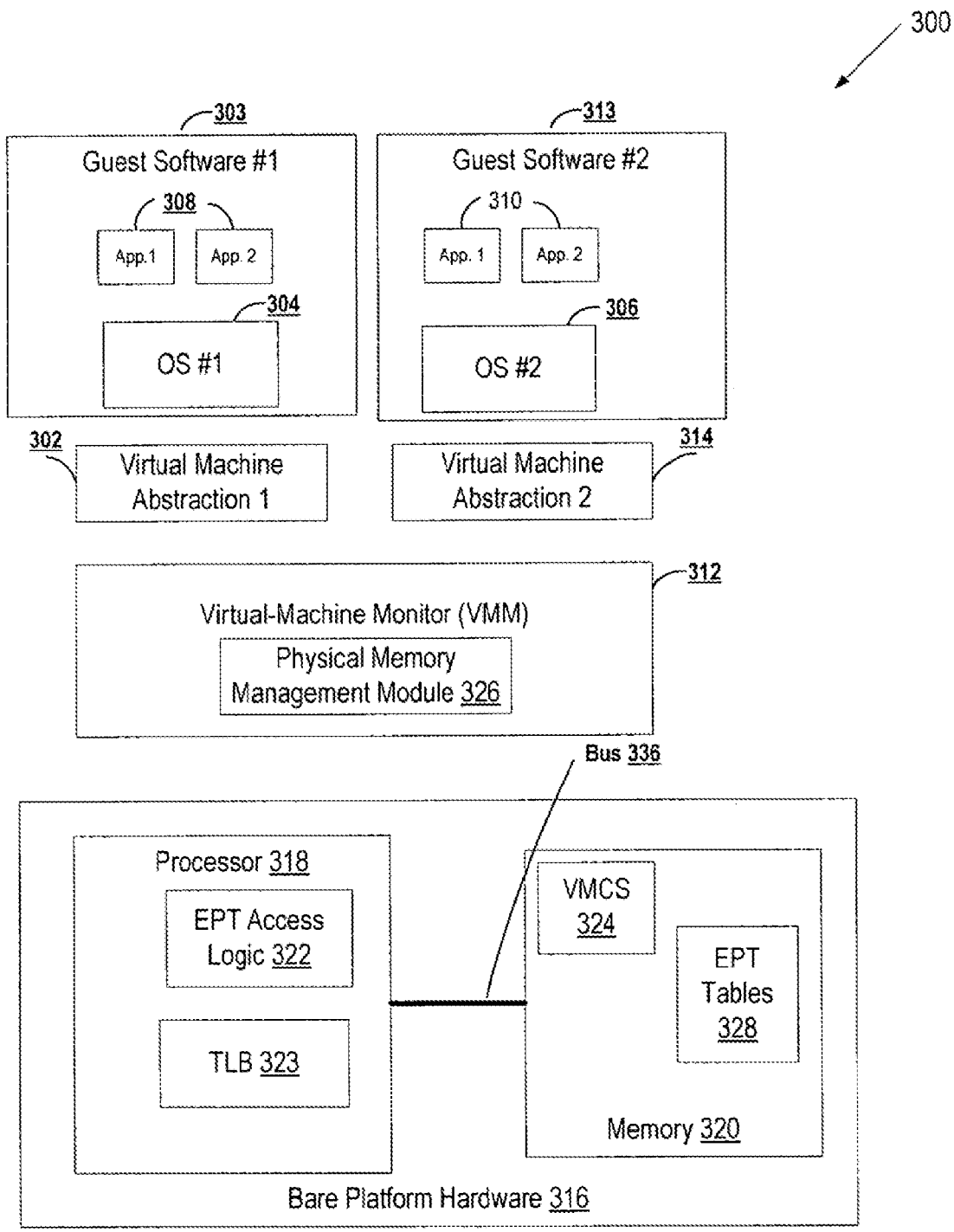
FIG. 3 depicts a high level structure of a virtual machine environment in one embodiment.

FIG. 3: FIG. 3 illustrates one embodiment of a virtual-machine environment 300. In this embodiment, a processor-based platform 316 may execute a VMM 312. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 312 may be run within, or using the services of, another VMM. VMMs may be implemented, for example, in hardware, software, firmware or by a combination of various techniques in some embodiments. In at least one embodiment, one or more components of the VMM may execute in one or more virtual machines and one or more components of the VMM may execute on the bare platform hardware as depicted in FIG. 3. The components of the VMM executing directly on the bare platform hardware are referred to herein as host components of the VMM.

The platform hardware 316 may be a personal computer (PC), server, mainframe, handheld device such as a personal digital assistant (PDA) or "smart" mobile phone, portable computer, set top box, or another processor-based system. The platform hardware 316 includes at least a processor 318 and memory 320. Processor 318 may be any type of processor capable of executing programs, such as a microprocessor, digital signal processor, microcontroller, or the like. The processor may include microcode, programmable logic or hard coded logic for execution in embodiments. Although FIG. 3 shows only one such processor 318, there may be one or more processors in the system in an embodiment. Additionally, processor 318 may include multiple cores, support for multiple threads, or the like. Memory 320 can comprise a hard disk, a floppy disk, random access memory (RAM), read only memory (ROM), flash memory, any combination of the above devices, or any other type of machine medium readable by processor 318 in various embodiments. Memory 320 may store instructions and/or data for performing program execution and other method embodiments. In some embodiments, some elements of the invention may be implemented in other system components, e.g., in the platform chipset or in the system's one or more memory controllers.

The VMM 312 presents to guest software an abstraction of one or more virtual machines, which may provide the same or different abstractions to the various guests. FIG. 3 shows two virtual machines, 302 and 314. Guest software such as guest software 303 and 313 running on each virtual machine may include a guest OS such as a guest OS 304 or 306 and various guest software applications 308 and 310. Guest software 303 and 313 may access physical resources (e.g., processor registers, memory and I/O devices) within the virtual machines on which the guest software 303 and 313 is running and to perform other functions. For example, the guest software 303 and 313 expects to have access to all registers, caches, structures, I/O devices, memory and the like, according to the architecture of the processor and platform presented in the virtual machine 302 and 314.

In one embodiment, the processor 318 controls the operation of the virtual machines 302 and 314 in accordance with data stored in a virtual machine control structure (VMCS) 324. The VMCS 324 is a structure that may contain state of guest software 303 and 313, state of the VMM 312, execution control information indicating how the VMM 312 wishes to control operation of guest software 303 and 313, information controlling transitions between the VMM 312 and a virtual machine, etc. The processor 318 reads information from the VMCS 324 to determine the execution environment of the virtual machine and to constrain its behavior. In one embodiment, the VMCS 324 is stored in memory 320. In some embodiments, multiple VMCS structures are used to support CPUs within one or more virtual multiple virtual machines.

The VMM 312 may need to manage the physical memory accessible by guest software running in the virtual machines 302 and 314. To support physical memory management in one embodiment, the processor 318 provides an extended page table (EPT) mechanism. In the embodiment, the VMM 312 may include a physical memory management module 326 that provides values for fields associated with physical memory virtualization that may need to be provided before transition of control to the virtual machine 302 or 314. These fields are collectively referred to as EPT controls. EPT controls may include, for example, an EPT enable indicator specifying whether the EPT mechanism should be enabled and one or more EPT table configuration controls indicating the form and semantics of the physical memory virtualization mechanism. These will be discussed in detail below. Additionally, in one embodiment, EPT tables 328 indicate the physical address translation and protection semantics which the VMM 312 may place on guest software 303 and 313.

In one embodiment, the EPT controls are stored in the VMCS 324. Alternatively, the EPT controls may reside in a processor 318, a combination of the memory 320 and the processor 318, or in any other storage location or locations. In one embodiment, separate EPT controls are maintained for each of the virtual machines 302 and 314. Alternatively, the same EPT controls are maintained for both virtual machines and are updated by the VMM 312 before each virtual machine entry.

In one embodiment, the EPT tables 328 are stored in memory 320. Alternatively, the EPT tables 328 may reside in the processor 318, a combination of the memory 320 and the processor 318, or in any other storage location or locations. In one embodiment, separate EPT tables 328 are maintained for each of the virtual machines 302 and 314. Alternatively, the same EPT tables 328 are maintained for both virtual machines 302 and 314 and are updated by the VMM 312 before each virtual machine entry.

In one embodiment, the processor 318 includes EPT access logic 322 that is responsible for determining whether the EPT mechanism is enabled based on the EPT enable indicator. If the EPT mechanism is enabled, the processor translates guest-physical addresses to host-physical addresses-based on the EPT controls and EPT tables 328.

In the embodiment depicted, the processor may further include a translation lookaside buffer (TLB) 323 to cache linear to guest-physical, guest-physical to host-physical address and linear to host-physical translations. Linear to guest-physical and linear to host-physical translations are referred to herein as "linear translations'. Guest-physical to host-physical and linear to host-physical translations are referred to herein as "physical translations".

In one embodiment, in which the system 300 includes multiple processors or multi-threaded processors, each of the logical processors is associated with a separate EPT access logic 322, and the VMM 312 configures the EPT tables 328 and EPT controls for each of the logical processors.

Resources that can be accessed by guest software (e.g., 303, including guest OS 304 and application 308) may either be classified as "privileged" or "non-privileged." For privileged resources, the VMM 312 facilitates functionality desired by guest software while retaining ultimate control over these privileged resources. Further, each guest software 303 and 313 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 312 to ensure proper operation of virtual machines 302 and 314 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

Figure 3A:
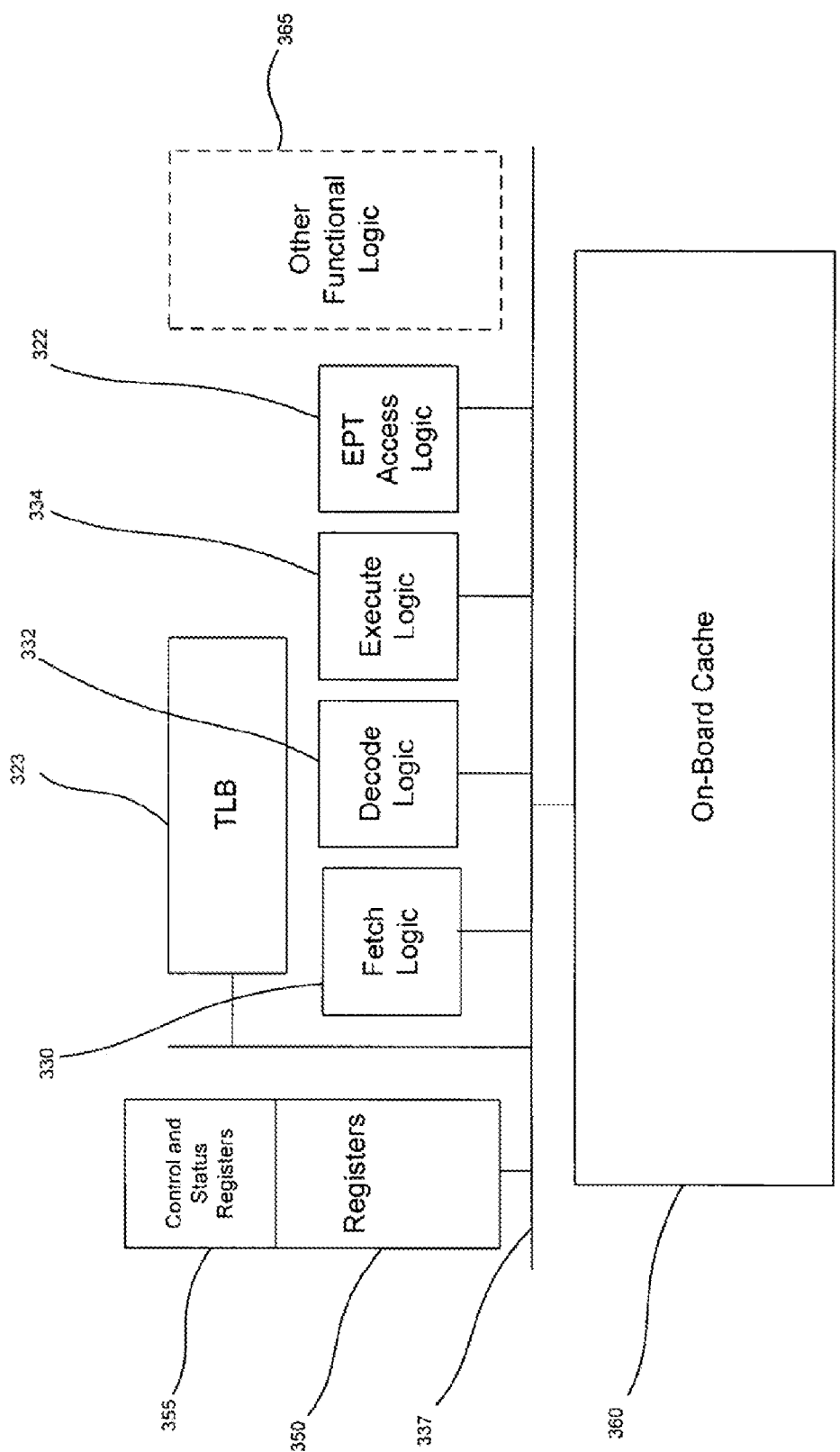
FIG. 3a represents a processor in one embodiment at a functional level.

FIG. 3a: FIG. 3a depicts at a high level some block level features of processor 318 in the embodiment of FIG. 3. In general, a processor such as the one depicted in FIG. 3 at 318 may include a processor bus or buses such as the one indicated at 337 in FIG. 3a. Furthermore, as depicted in FIG. 3a, a processor may include registers 350 in one or multiple banks, and each register may have the capacity to store 32, 64, 128 or another number of bits of data as is known. Each register bank may further have several registers, such as e.g. 8, 32, 64 registers. Some registers may be dedicated to control and status use for example to store the CR bits as in an x86 embodiment. In other embodiments, other control registers and flags may be stored in the processor to allow different modes of operation and status checking as is known in the art. In general a processor such as the one depicted in the embodiment of FIG. 3 would include logic or logic circuitry 330 to fetch instructions and data from memory, cache or other storage; logic or logic circuitry to decode instructions and execution units such as 334 to perform the instructions. Many variations on these functional units are possible, e.g. execution in the execution unit may be pipelined; or include speculation, and branch prediction; or have other features as related to a particular processor or application. Other functional logic 365 may be present in the processor such as logic for arithmetic, graphics processing, and many other specific functions of the processor as is known. An on-board cache 360 may be present in some embodiments. This cache may have various sizes such as 128 MB, 1 GB, etc. as is known As previously indicated with reference to FIG. 3, the processor 318 includes EPT access logic 322 and TLB 323. The EPT access logic may include in one embodiment logic to populate, control and mange the EPT; and the TLB is generally a buffer including mappings from page tables that are cached for efficiency and other purposes within the processor.

Figure 4:
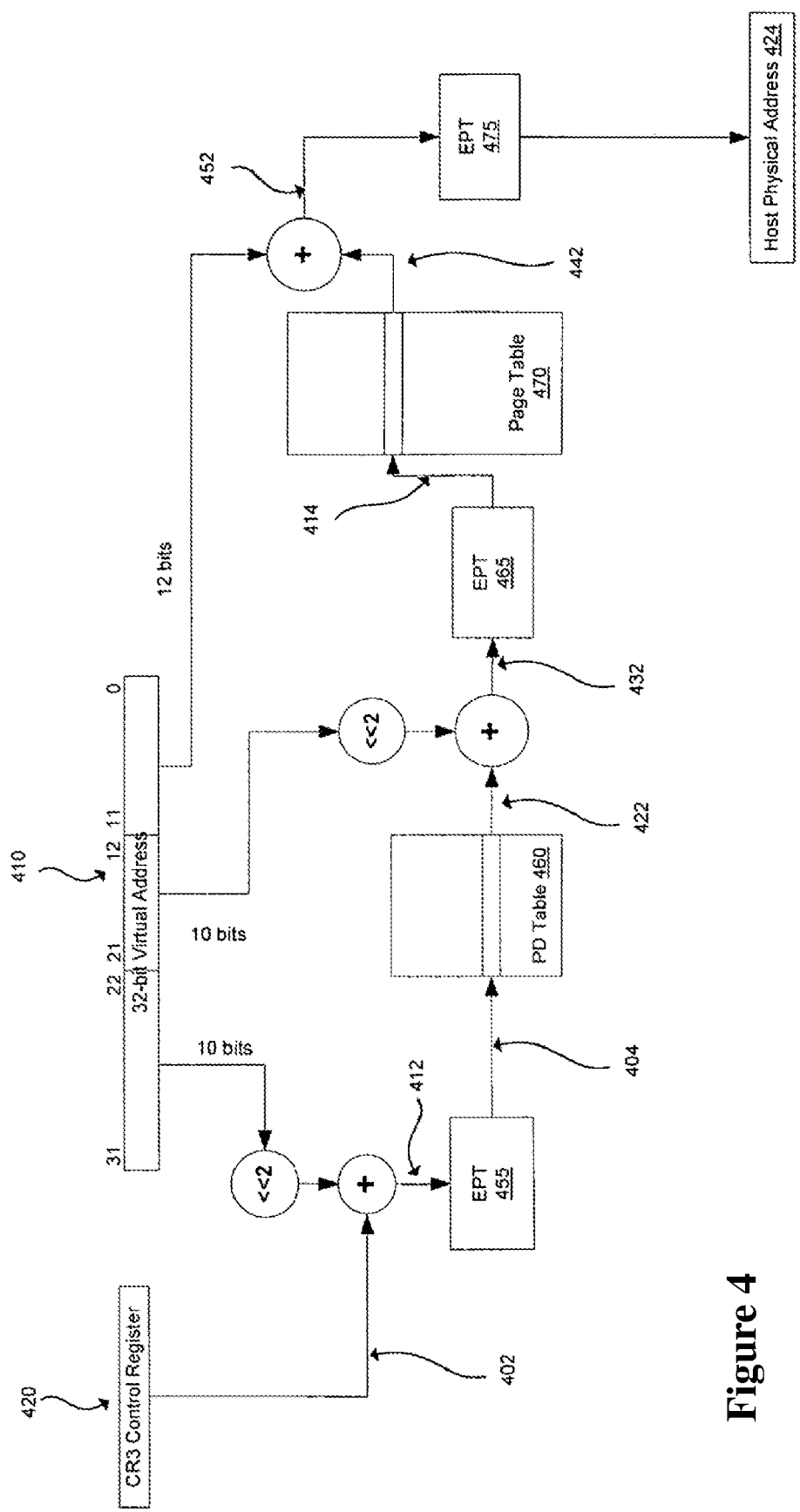
FIG. 4 depicts address computation using extended paging tables in one embodiment.

FIG. 4: FIG. 4 shows one example of processing using the extended page tables introduced above to ultimately compute a host-physical address when guest software in a virtual machine references a guest virtual address. The example depicted shows guest software running in an x86 platform using simple 32-bit virtual addressing and simple page table formats. One skilled in the art will easily be able to extend this example to understand, for example, other paging modes (e.g., 64-bit addressing in the guest software), other instruction set architectures (e.g., The Intel Itanium® Architecture, 64-bit and other variations of the x86 architecture, the PowerPC® Architecture, among many others, and to other configurations.

In FIG. 4 a reference to a guest virtual address 410 is executed by guest software executing in a virtual machine. The memory management mechanism active in the guest (i.e., configured by the guest operating system) is used to translate the virtual address to a guest-physical address. Each guest-physical address used in the translation, and the resulting guest-physical address, are translated to host-physical addresses through EPT before accessing the host-physical memory. This process is detailed in the following discussion.

In this example, the appropriate bits 402 in the CR3 register 420 point to the base of the guest's page directory table 460 in guest-physical memory. This value 402 is combined with the upper bits from the guest virtual address 410 (appropriately adjusted, according to x86 semantics by multiplying by 4 because, in this example, the entries in the tables are 4 bytes each) to form the guest-physical address 412 of the page directory entry (PDE) in the guest's PD table 460. This value 412 is translated through the EPT tables 455 to form the host-physical address 404 of the page directory entry. The processor accesses the page directory entry using this host-physical address 404.

Information from the PDE includes the base address 422 of the guest's page table 470. This guest-physical address 422 is combined with bits 21:12 of the guest virtual address 410 appropriately adjusted to form the guest-physical address 432 of the page table entry in the guest's page table 470. This guest-physical address 432 is translated through the EPT tables 465 to form the host-physical address 414 of the guest's page table entry (PTE). The processor accesses the PTE using this host-physical address 414.

Information from the PTE includes the base address 442 of the page in guest-physical memory being accessed. This value is combined with the low-order bits (11:0) of the guest virtual address 410 to form the guest-physical address 452 of the memory being accessed. This value 452 is translated through the EPT tables 475 to form the host-physical address 424 of the memory being accessed.

Each time the EPT tables are used to translate a guest-physical address to a host-physical address, the processor also validates that the access is permitted according to controls in the EPT tables, as will be described below. Additionally, it must be understood that the EPT tables 455, 465, and 475, though indicated as distinct in FIG. 4 may, in one embodiment, be the same set of EPT tables (i.e., a single set of EPT tables is used for all address translations from guest-physical to host-physical).

In a typical implementation of linear memory support in a processor-based system, mappings from linear addresses to physical addresses that are stored in a page table structure may be cached for efficiency reasons in a translation lookaside buffer (TLB). Instructions may be included in a processor instruction set to manage the TLB and to allow a program executing in the processor based system to ensure that a particular entry in the TLB is synchronized with a page table entry. Thus for example, in the x86 architecture, the MOV CR instruction may cause a global invalidation of all TLB entries, and thus a resynchronization of the entries as addresses are accessed. Alternatively, in the x86 example, a INVLPG instruction may be used to invalidate a mapping stored in the TLB for a specific linear address, causing the entry in the TLB to be updated and synchronized with the mapping in the page table.

In one embodiment, including a virtualized system that incorporates an extended paging table (EPT) as discussed above, a TLB may cache guest linear to host physical address translations for processes executing in guest machine memory; and host linear to host physical mappings for processes such as the VMM executing directly on the host machine, as discussed previously with reference to FIG. 3 at 323. In the former case, the guest linear to host physical mappings may be derived both from page tables in the guest as well as from the EPT; in the latter case, the mappings may be derived from the host page tables. An additional type of mapping may also be stored in the TLB: a mapping directly derived from guest physical to host physical memory based on the mappings stored in the EPT.

In one embodiment, a new command is added to the processor instruction set. In this embodiment, the new command INVL_EPT provides programs executing directly on the host machine of a virtualized system, such as the VMM, with a way to manage TLB entries derived from guest-physical to host-physical mappings. Specifically, in this embodiment, the INVL_EPT instruction ensures that guest-physical to host-physical and linear to host physical mappings in the TLB are synchronized with EPT tables that reside in host memory, and to specify the extent of synchronization, the EPT context, and where relevant, the guest physical memory address for which mappings are to be synchronized. A context generally speaking defines a portion of the address space of a system. For guest-physical to host-physical mappings, the EPT context is defined by the currently active EPT table, which in turn is referenced by a register in this embodiment, termed the EPT Pointer, or the EPTP In this embodiment, the INVL_EPT instruction has three operands, first a value, for an instruction mode or variant specification; a second operand, a value specifying the EPT pointer, which is equivalent to the EPT context in which the INVL_EPT instruction is to execute; and a third operand, a value specifying the guest physical address associated with the TLB entries to be invalidated. In this embodiment, the first operand is provided as an 8 bit immediate value, and the second and third operand are provided as a block in memory, each occupying 64 bits. Other embodiments are possible. For example, the operands may be provided in registers or other memory locations either explicitly or implicitly.

The first operand in this embodiment is a switch or flag with at least three defined values, and thus specifying that the INVL_EPT instruction is to execute in one of three possible modes:

1. Individual Address mode: in this mode, physical translations in the TLB associated with a single guest physical address are synchronized to the EPT, based on the mappings for that address in the EPT referenced by the context provided in the second operand as described above.

2. Context mode: in this mode, the guest address parameter (third operand as described above) is ignored, and those entries in the TLB in the EPT context specified in the second operand as described above, are synchronized with the EPT.

3. Global mode: in this mode, both the guest address parameter and the EPT context parameters are ignored and TLB entries derived from any EPT context are synchronized.

Figure 5:
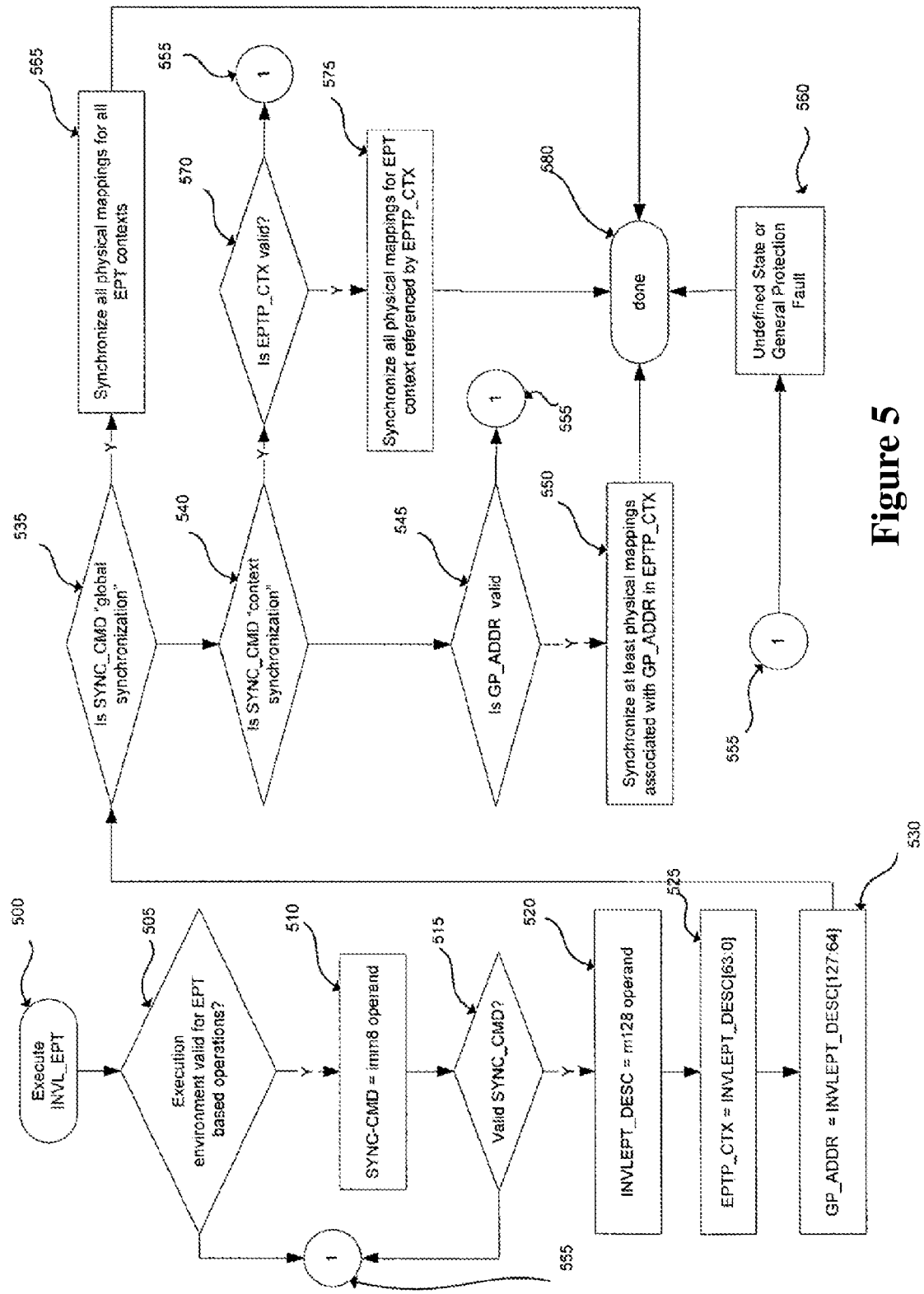
FIG. 5 depicts the flow of instruction execution in one embodiment.

FIG. 5. The flowchart of FIG. 5 depicts the execution of the INVL_EPT instruction in one embodiment. The execution begins at 500. First, the processor may conduct a number of tests to ensure that the current execution environment is valid for EPT related operations, at 505. These tests may include a test to ensure that the system is in a virtualized mode of operation; that paging is enabled; and that there are no current error states, among others. If the execution environment is not valid, the instruction may either exit to an undefined state, generate a general protection fault, generate an undefined opcode fault or the like via 555 and 560. If the execution environment is valid, the instruction execution then reads, in this embodiment, an immediate 8 bit operand at 510. This operand termed SYNC_CMD is expected to represent a valid mode for the INVL_EPT instruction as detailed above. If the operand is not valid, at 515, the instruction exits as before to 555 and 560. If the operand is valid, execution then proceeds to read the second and third operands from memory, 520, and as discussed previously, the operands are expected to be at a 128 bit block in memory at a reference labeled INVLEPT_DESC in the figure. The first 64 bits in this embodiment are the EPT context, or the EPT table pointer and are extracted as EPTP_CTX at 525; the next 64 bits are the guest-physical address parameter for the instruction, extracted as GP_ADDR at 530.

The execution of the instruction then proceeds to execute the actual synchronization depending on the value of the SYNC_CMD operand in the flow of execution depicted at 535 to 580. As described previously, SYNC_CMD may be either be an indication to perform a global synchronization of the TLB based on all EPT contexts; or an indication to perform a synchronization of only the EPT context specified by an operand of the instruction; or finally, to perform a synchronization of only the guest-physical address passed as a parameter in the EPT context provided as a parameter. In this embodiment, as shown in the execution flow in FIG. 5, a check for the SYNC_CMD value being takes place at 535; the second at 540; and the third at 545. At 535, if the value of SYNC_CMD indicates global synchronization, the instruction executes to synchronize all physical mappings for all EPT contexts, and execution is complete, 580. Otherwise, if SYNC_CMD indicates context specific synchronization at 540, execution then proceeds to check if the provided EPTP_CTX value is valid. If it is not, because, for instance, a reserved bit is set in the value or the address in the EPTP is invalid, execution of the instruction terminates with a General Protection Fault, 555 and 560. If the context provided is valid, execution continues, synchronizing all physical mappings for the EPT context referenced by EPTP_CTX at 575, and then completes 580.

If SYNC_CMD is neither global nor context wide synchronization, and is also a valid mode of operation, the only remaining possibility in this embodiment is for the command to synchronize a specific guest physical address. Execution then checks if the GP_ADDR parameter provided at 545 is valid. If an invalid address is provided, execution exits at 555 and 560 with a general protection fault. Otherwise, all physical mappings associated with the provided guest physical address GP_ADDR are synchronized with the EPT referenced by the context provided in EPTP_CTX at 550, and execution completes, 580.

It will be clear to one of ordinary skill in the art that the above described embodiments may be varied widely. In some embodiments, a command equivalent to INTVL_EPT may be available, but may have a different syntax, including a name, the number, format, and size of parameters, among others. As is known, different instruction set architectures (ISA) exist, and a similar command may be provided for a different ISA with format and other characteristics consistent with that ISA. For one example, an instruction to invalidate and/or synchronize a TLB with an EPT for a processor based on the Intel® Itanium Architecture may readily be visualized and described based on the descriptions of the embodiments provided above by one of ordinary skill in the art; as might instructions for any other ISA.

The discussion relating to EPT context in the embodiments referenced above should not be seen as limiting. In other embodiments, there may be only one instance of an EPT, in others, several instances may be operational as discussed in the x86 instance, with a reference mechanism such as a reference register or pointer akin to the EPTP discussed above.

In other embodiments, the number and format of parameters may vary. For example, in the above described embodiments, the INVL_EPT instruction has one immediate and two memory based operands. In other embodiments, more immediate operands may be used; in others all operands may be memory based; in yet other embodiments, operands may be read from registers or other stores within the processor, among many other variations that are known.

The above described embodiments are described with reference to three modes of operation for the INVL_EPT instruction. In other embodiments, some or all of these modes may be missing; in others, more modes may be available. For instance, in some embodiments, there may be no mode for individual address invalidation, and in such a mode, all TLB entries would be synchronized. In some embodiments, there may be only one instance of an EPT operating in the system, and in such embodiments, the context mode may be unnecessary. Alternatively, in some embodiments, only individual address synchronization may be available; or in others, only global address synchronization may be used, making the first operand as described with reference to INVL_EPT unnecessary.

While these variations on the instruction and its operation are possible, many others may readily be envisaged by one of ordinary skill in the art, including variations where the general effect of the INVL_EPT instruction is obtained by a combination of other instructions, among many others.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:
1. An apparatus comprising:
a plurality of cores to execute multiple threads;
an instruction fetch circuit to fetch instructions of the threads from a memory subsystem;
a decoder to decode the instructions;
virtualization circuitry to implement a virtualization environment comprising one or more guests and a virtual machine monitor (VMM) to manage the guests;
memory management circuitry to translate guest virtual addresses to guest physical addresses using a first set of page tables and to translate the guest physical addresses to host physical addresses using a second set of page tables;

a translation lookaside buffer (TLB) to cache address translation entries, including at least one entry with an address from the first set of page tables and at least one entry with an address from the second set of page tables; and execution circuitry to execute a first TLB management instruction having an operand associated with a region in host physical memory, the execution circuitry to synchronize those TLB entries associated with the region.

2. The apparatus of claim 1 wherein the execution circuitry is to execute program code of the VMM to trap events generated by the one or more guests.

3. The apparatus of claim 2 wherein the events include writes to control registers associated with address translations and handling page faults.

4. The apparatus of claim 3 wherein the VMM is to execute privileged instructions responsive to the events to access execution resources of the execution circuitry.

5. The apparatus of claim 1 wherein the region is associated with a particular context.

6. The apparatus of claim 1 wherein the execution circuitry is to execute a second TLB management instruction having an operand to identify an individual guest virtual address, the execution circuitry to invalidate at least one TLB entry associated with the guest virtual address.

7. The apparatus of claim 6 wherein the execution circuitry is to execute a third TLB management instruction having an operand to identify a specific guest physical address, the execution circuitry to invalidate at least one TLB entry associated with the guest physical address.

8. The apparatus of claim 7 wherein the execution circuitry is to execute a third TLB management instruction to cause the execution circuitry to invalidate a plurality of TLB entries regardless of a guest or host address associated with the third TLB management instruction.

9. The apparatus of claim 1, further comprising:
system memory to store instructions and data.

10. The apparatus of claim 1 further comprising:
a mass storage.

* * * * *